(12) United States Patent
Parenti

(10) Patent No.: US 9,283,904 B2
(45) Date of Patent: Mar. 15, 2016

(54) SECURE ATTACHMENT

(71) Applicant: Steve Parenti, Newark, CA (US)

(72) Inventor: Steve Parenti, Newark, CA (US)

( * ) Notice: Subject to any disclaimer, the term of this patent is extended or adjusted under 35 U.S.C. 154(b) by 68 days.

(21) Appl. No.: 14/273,968

(22) Filed: May 9, 2014

(65) Prior Publication Data

US 2015/0321624 A1 Nov. 12, 2015

(51) Int. Cl.
  F16B 41/00 (2006.01)
  F16B 37/14 (2006.01)
  B60R 13/10 (2006.01)
  F16B 21/12 (2006.01)
  F16B 39/22 (2006.01)

(52) U.S. Cl.
  CPC ............ B60R 13/105 (2013.01); F16B 21/12 (2013.01); F16B 37/14 (2013.01); F16B 39/22 (2013.01); F16B 41/005 (2013.01); *Y10T 29/49964* (2015.01)

(58) Field of Classification Search
  CPC .............................. F16B 41/005; F16B 37/14
  USPC ................. 411/910, 372.5, 372.6, 373, 374
  See application file for complete search history.

(56) References Cited

U.S. PATENT DOCUMENTS

| 3,296,842 | A | | 1/1967 | Auerbach et al. | |
|---|---|---|---|---|---|
| 3,605,460 | A | | 9/1971 | Singer et al. | |
| 3,707,860 | A | | 1/1973 | Singer et al. | |
| 3,748,879 | A | | 7/1973 | Singer et al. | |
| 3,910,079 | A | | 10/1975 | Gassaway | |
| 4,540,322 | A | * | 9/1985 | Coffia | F16B 41/005 411/338 |
| 4,611,379 | A | * | 9/1986 | Heitzman | F16B 41/005 29/426.5 |
| 4,732,517 | A | * | 3/1988 | Crouch | B25B 9/00 411/10 |
| 4,756,652 | A | | 7/1988 | Hatter | |
| 5,630,687 | A | * | 5/1997 | Robinson | F16B 41/005 411/372.6 |
| 6,053,683 | A | * | 4/2000 | Cabiran | F16B 37/14 411/372.6 |
| 6,892,483 | B2 | | 5/2005 | Parenti | |
| D621,254 | S | | 8/2010 | Camisasca | |
| 8,523,504 | B1 | * | 9/2013 | Hill | B60R 13/105 411/374 |
| 9,133,874 | B2 | * | 9/2015 | Hill | F16B 37/14 |
| 2004/0170487 | A1 | * | 9/2004 | Thompson | F16B 33/004 411/374 |
| 2011/0027044 | A1 | * | 2/2011 | Dillenberger | F16B 37/14 411/372.5 |

* cited by examiner

*Primary Examiner* — Flemming Saether
(74) *Attorney, Agent, or Firm* — Douglas L Weller

(57) ABSTRACT

A security attachment device can be used to securely attach a license plate to an automobile. A cap covers a screw used to attach a license plate to an automobile. An anchor anchors a container and the license plate to the automobile so that the container can freely rotate while anchored to the automobile. A ring is sized to fit over the container so that when the cap is attached to the container, the ring covers portions of the container not covered by the cap. The ring contains a first pin and the container contains a second pin hole. The first pin hole is located on the ring and the second pin hole is located on the container at locations that allow the first pin hole and the second pin hole to be aligned to receive a pin that when placed through the first pin hole into the second pin hole allows anchoring of the ring to the container when the cap is being screwed onto the container.

10 Claims, 4 Drawing Sheets

SECURE ATTACHMENT

BACKGROUND

Tamper proof "security screws" and nuts have been used to prevent or frustrate vandals and petty thieves. These are used, for example to secure wheel rims to automobiles or protect against unauthorized removal of license plates. Some security screws rely upon a screw head having an unusual shape that requires a special tool to be used. Other security screws may have an asymmetric one-way, clutch head design that allows for easy attachment but not for removal. Alternatively, a threaded cap requiring a special tool to remove the cap may be used to hinder access to a traditional screw, as shown for example in D621,254S.

DESCRIPTION OF THE EMBODIMENT

Figure 1:
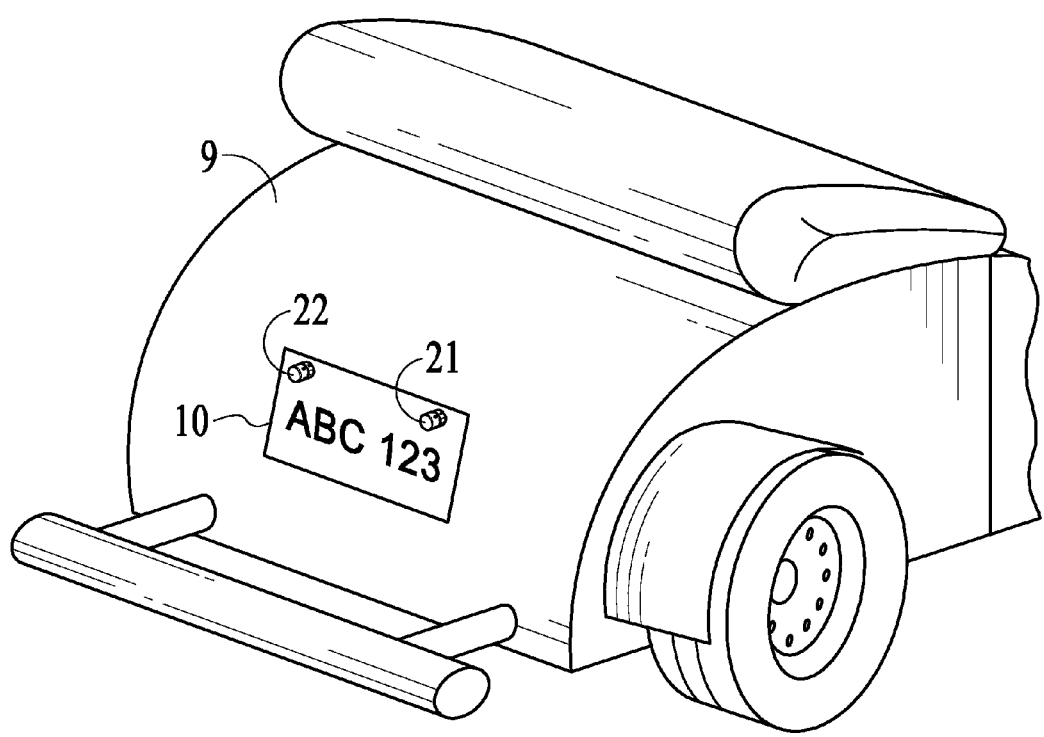
FIG. 1 shows a license plate securely attached to an automobile in accordance with an embodiment of the invention.

FIG. 1 shows a license plate 10 securely attached to an automobile 9 using screws covered by a security cover 21 and a security cover 22.

Figure 2:
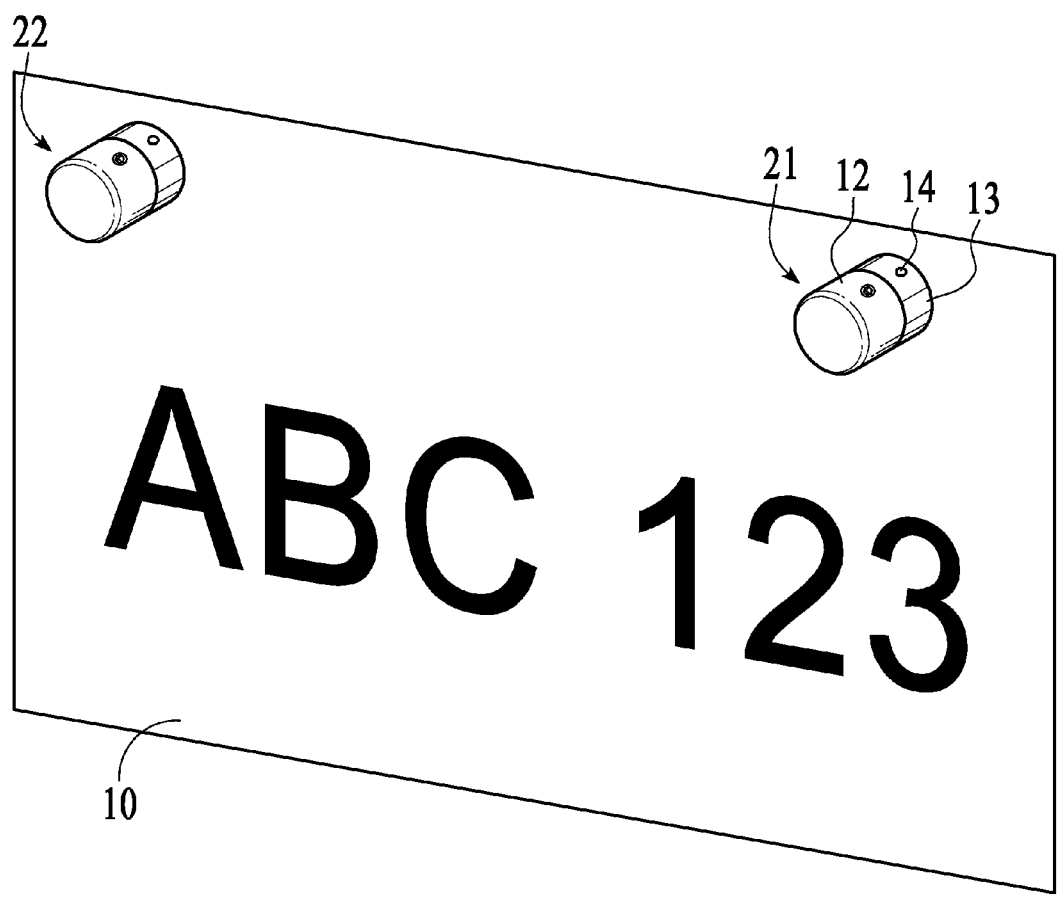
FIG. 2 shows security covers being used to securely attach a license plate to an automobile in accordance with an embodiment of the invention.

FIG. 2 shows additional details of security cover 21 as assembled. Particularly, a cap 12 and a ring 13 both spin freely when security cover 21 is attached to automobile 9. A hole 14 is used to attach and remove secure security cover 21, as is further described below.

Figure 3:
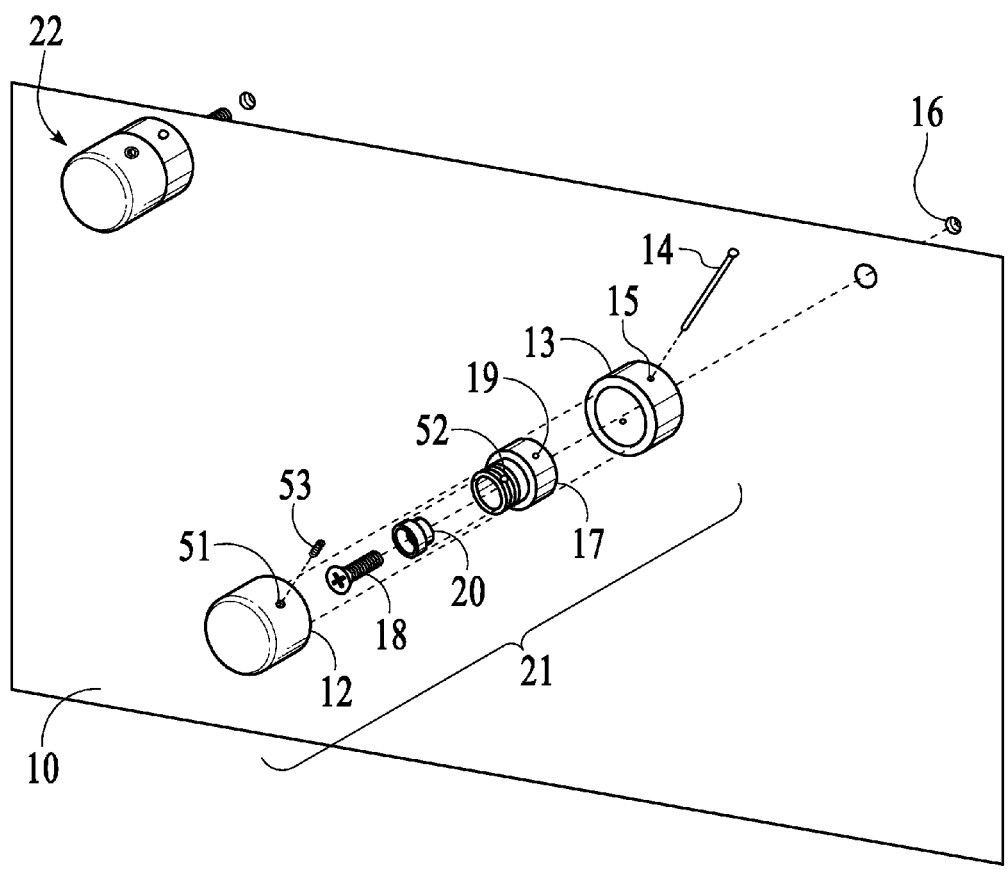
FIG. 3 and FIG. 4 show a disassembled security cover in accordance with an embodiment of the invention.
Figure 4:
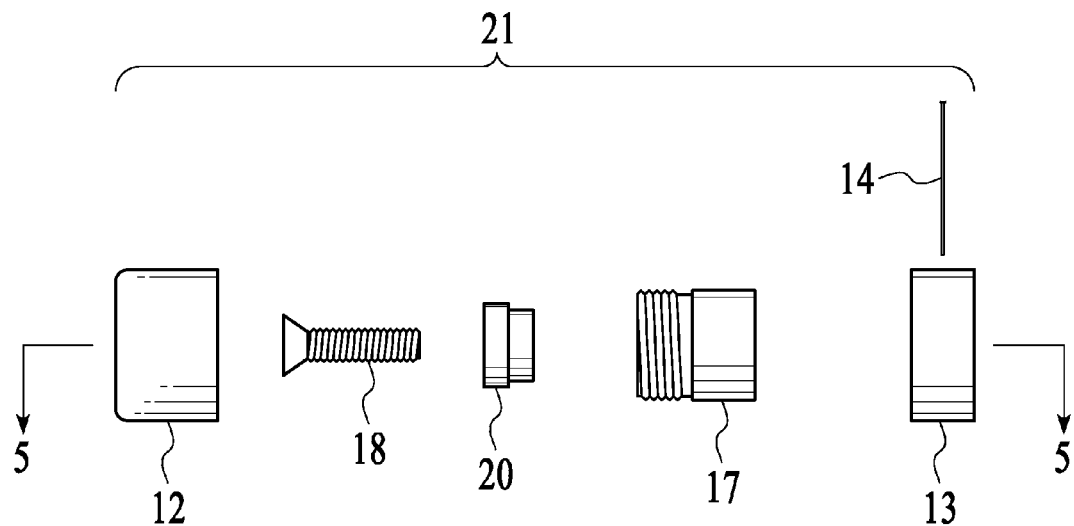

FIG. 3 and FIG. 4 show security cover 21 in a disassembled state. To assemble, a screw 18 is placed through an anchor 20. Herein, screw is used generically to refer to screws, bolts or any other attachment device that uses helical threads for secure attachment. For example screw 18 is a standard screw that may have a head shaped to receive a Phillips screwdriver or a flat head screwdriver. Alternatively, screw 18 may have another standard or non-standard shaped screw head. Anchor 20 is placed within container 17 while screw 18 is placed through a hole in license 10 and screwed into a threaded hole 16 in automobile 10. When tightened, screw 18 holds anchor 20 tightly against license 10. Anchor 20 and the inside of container 17 are shaped so that when screw 18 is tightened, container 17 can be freely rotated while being securely prevented from removal from license 10 and automobile 9.

Cap 12 includes internal screw threads (shown in FIG. 5) that match external screw threads on an external surface of a portion of container 17, as shown in FIG. 3.

Ring 13 is located over the unthreaded portion of container 17 and rotated so that a hole 15 in ring 13 is aligned with a hole 19 in container 17. Placing a pin 14 through hole 15 and hole 19 allows a user to prevent rotation of container 17 when cap 12 is screwed on to container 17 or when cap 12 is screwed off of container 17. Once license plate 10 is attached to automobile 9, hole 15 can be filled in, for example, using solder, glue, or some other filling material, when it is desired to increase the difficulty of removing screw 18 from hole 16.

For example parts of security cover 21 and security cover 22 are made of steel, another suitable metal, alloy or other hard material, such as a very hard plastic.

FIG. 3 additionally shows an optional set screw 53 that can be used after license place 10 is attached to automobile 9 and cap 12 is mounted on container 17. Threaded hole 51 on cap 51 is aligned with hole 52 on container 17 and set screw 53 is screwed in. For example, set screw 53 is a hex key or Allen key that can be screwed in using an Allen wrench. Alternatively, set screw 53 can have another type of screw head or bolt head. This provides one more layer of protection to removal of license plate 10.

Figure 5:
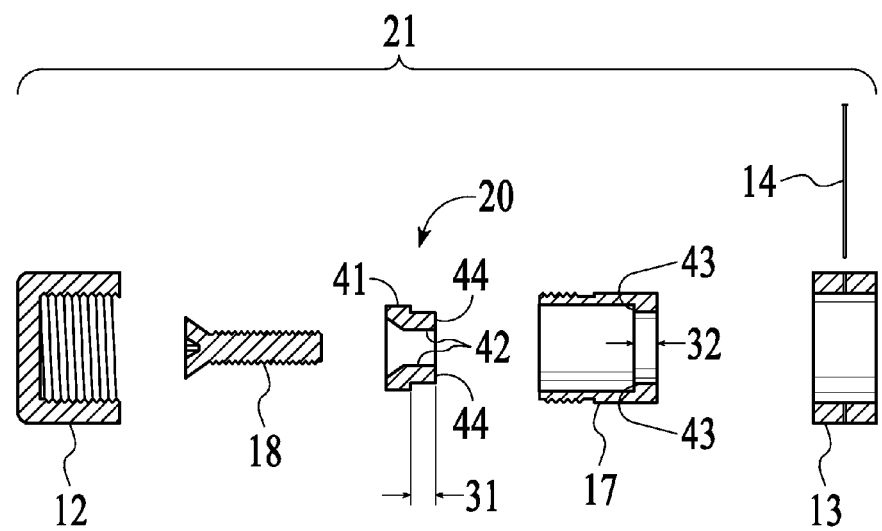
FIG. 5 shows a simplified cross-section of a disassembled security cover in accordance with an embodiment of the invention.

FIG. 5 shows a simplified cross-section of disassembled security cover 21. When screw 18 is tightened against license 10, a bottom face 44 of a narrowed ring 42 of anchor 20 is pressed against license 10. A lip region 41 of anchor 20 locks a lip region 43 of container 17 against license 10. A length 31 of narrowed ring 42 is slightly longer than a width 32 of lip region 43. This gives sufficient slack so that container 17 can still rotate freely even when screw 18 tightly holds anchor 20 against license 10.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A license plate attachment device comprising:
    a cap that covers a screw used to attach a license plate to an automobile, the cap including internal screw threads;
    a container onto which the cap can be attached, the container including external screw threads that match the internal screw threads of the cap;
    an anchor that when held tightly in place on the automobile by the screw, anchors the container and the license plate to the automobile so that the container can freely rotate while anchored to the automobile;
    a ring sized to fit over the container so that when the cap is attached to the container, the ring covers portions of the container not covered by the cap;
    wherein the ring contains a first pin hole and the container contains a second pin hole, the first pin hole being located on the ring and the second pin hole being located on the container at locations that allow the first pin hole and the second pin hole to be aligned to receive a pin that when placed through the first pin hole into the second pin hole allows anchoring of the ring to the container when the cap is being screwed onto the container.

2. A license plate attachment device as in claim 1, wherein the anchor includes:
    a narrowed ring with a bottom face that is pressed in contact with the license plate; and
    a lip region used to anchor the container against the license plate.

3. A license plate attachment device as in claim 2, wherein the container includes:
    a lip region used by the lip region of the anchor to anchor the container against the license plate.

4. A license plate attachment device as in claim 3 wherein a length of the lip region of the container is shorter than a length of the narrowed ring.

5. A license plate attachment device as in claim 1:
    wherein the cap includes a first screw hole;
    wherein the container includes a second screw hole; and wherein the first screw hole and the second screw hole are sized so that a set screw can be placed through the first screw hole and the second screw hole when the first screw hole and the second screw hole are aligned.

6. A security attachment device comprising:

a cap that covers a screw, the cap including internal screw threads;

a container onto which the cap can be attached, the container including external screw threads that match the internal screw threads of the cap;

an anchor that when held tightly in place against an object by the screw, anchors the container to the object so that the container can freely rotate while anchored to the object;

a ring sized to fit over the container so that when the cap is attached to the container, the ring covers portions of the container not covered by the cap;

wherein the ring contains a first pin hole and the container contains a second pin hole, the first pin hole being located on the ring and the second pin hole being located on the container at locations that allow the first pin hole and the second pin hole to be aligned to receive a pin that when placed through the first pin hole into the second pin hole allows anchoring of the ring to the container when the cap is being screwed onto the container.

7. A security attachment device as in claim 6, wherein the anchor includes:

a narrowed ring with a bottom face that is pressed in contact with the object; and a lip region used to anchor the container against the object.

8. A security attachment device as in claim 7, wherein the container includes:

a lip region used by the lip region of the anchor to anchor the container against the object.

9. A security attachment device as in claim 8 wherein a length of the lip region of the container is shorter than a length of the narrowed ring.

10. A security attachment device as in claim 6:

wherein the cap includes a first screw hole;

wherein the container includes a second screw hole; and wherein the first screw hole and the second screw hole are sized so that a set screw can be placed through the first screw hole and the second screw hole when the first screw hole and the second screw hole are aligned.

* * * * *